United States Patent
Foster et al.

(10) Patent No.: US 8,565,412 B2
(45) Date of Patent: Oct. 22, 2013

(54) SERVICING CALLS IN CALL CENTERS BASED ON ESTIMATED CALL VALUE

(75) Inventors: Robin H. Foster, Little Silver, NJ (US); Hongguang Li, Broomfield, CO (US); Lynn R. Smith, Westminster, CO (US); Katherine A. Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 1113 days.

(21) Appl. No.: 12/490,238

(22) Filed: Jun. 23, 2009

(65) Prior Publication Data
US 2010/0322406 A1 Dec. 23, 2010

(51) Int. Cl.
*H04M 3/00* (2006.01)

(52) U.S. Cl.
USPC ............. 379/266.01; 379/265.01; 379/265.02

(58) Field of Classification Search
USPC ........................... 379/265.02, 266.01–266.02
See application file for complete search history.

(56) References Cited

U.S. PATENT DOCUMENTS

| | | |
|---|---|---|
| 5,854,832 A | 12/1998 | Dezonno |
| 6,463,346 B1 | 10/2002 | Flockhart et al. |
| 6,714,643 B1 | 3/2004 | Gargeya et al. |
| 6,804,346 B1 | 10/2004 | Mewhinney |
| 7,123,709 B1 | 10/2006 | Montgomery et al. |
| 8,117,064 B2 | 2/2012 | Bourne et al. |
| 2002/0141561 A1 | 10/2002 | Duncan et al. |
| 2003/0195753 A1 | 10/2003 | Homuth |
| 2005/0069119 A1 | 3/2005 | Erhart et al. |
| 2006/0165050 A1 | 7/2006 | Erhart et al. |
| 2006/0182259 A1 * | 8/2006 | Shaffer et al. ............ 379/265.02 |

\* cited by examiner

*Primary Examiner* — Rasha Al Aubaidi
(74) *Attorney, Agent, or Firm* — Kacvinsky Daisak PLLC; John Maldjian, Esq.; Alexander D. Walter, Esq.

(57) ABSTRACT

Methods for enabling call center agents to adapt their servicing of incoming calls based on the estimated value of the calls are disclosed. In accordance with the first illustrative embodiment, when there is a "high-value" call waiting in the queue while one or more agents are currently servicing lower-value calls, an agent who is servicing a lower-value call is informed that there is a higher-value call waiting in the queue, and is prompted to provide an estimate of how much longer he or she will be servicing his or her current call. The call center system selects which agent the high-value call will be routed to based on: (i) the agents' responses to the prompts, and (ii) for each of the responding agents, a measure of how closely prior responses from the agent compared to the actual amount of time taken by the agent to complete servicing the call.

15 Claims, 2 Drawing Sheets

US 8,565,412 B2

SERVICING CALLS IN CALL CENTERS BASED ON ESTIMATED CALL VALUE

FIELD OF THE INVENTION

The present invention relates to call centers in general, and, more particularly, to using estimated call value to influence how calls are serviced by agents.

BACKGROUND OF THE INVENTION

A call center is a facility where telephone calls are handled by human operators known as agents, usually with some amount of computer automation. Typically, a call center has the ability to handle a considerable volume of calls, providing functions such as routing calls to agents, logging calls, recording calls, and so forth. Call centers are used by many mail-order catalog organizations, telemarketing companies, computer product help desks, government agencies, and large enterprises.

Typically, when a call is received at a call center, the call is automatically routed to an agent who is not currently engaged in a conversation with another caller. If all agents are busy, typically the call is inserted into a queue and the caller is placed "on hold." Callers on hold are typically played a message such as the following: "All agents are currently assisting other customers. Please stay on the line and the next available agent will take your call. Calls are answered in the order that they are received".

SUMMARY OF THE INVENTION

The present invention enables call center agents to adapt their servicing of incoming calls based on the estimated value of the calls. In accordance with the first illustrative embodiment, when there is a "high-value" call waiting in the queue while one or more agents are currently servicing lower-value calls, an agent who is servicing a lower-value call is informed that there is a higher-value call waiting in the queue, and is prompted to provide an estimate of how much longer he or she will be servicing his or her current call. The prompts also have the effect, either explicitly or implicitly, of encouraging agents to "wrap up" their current call as quickly as possible.

Once the responses to the prompts have been received, the call center system (more precisely, a data-processing system in the call center) selects which agent the high-value call will be routed to—once that agent completes his or her current call—based on:

(i) the agents' responses to the prompts, and
(ii) for each of the responding agents, a measure of how closely prior responses from the agent compared to the actual amount of time taken by the agent to complete servicing the call.

For example, if a first agent responds with an estimate of 20 seconds and a second agent responds with an estimate of 35 seconds, but data collected from prior calls indicate that the first agent typically takes three times as long as his or her estimate (which, in this case, would be 60 seconds), and that the second agent typically takes less time than his or her estimate, then the second agent might be selected to handle the call, rather than the first agent.

In a second illustrative embodiment of the present invention, the agents are prompted to provide information about their current call (e.g., the current "work stage" of the call, etc.), rather than provide estimates of the time remaining for the call. The call center system then estimates, based on the responses to the prompts, how much time is remaining for each call, and selects the agent that will handle the high-value call.

The first illustrative embodiment comprises: (a) receiving one or more signals that indicate that: (i) a call C to a call center is queued for service, and (ii) a non-empty set of agents of said call center are currently serving respective calls that are estimated to be less valuable than said call C; (b) transmitting to each of said non-empty set of agents, in response to said one or more signals, a first signal that: (i) notifies the agent of said call C, and (ii) prompts the agent for an estimate of how much longer the agent will be serving their current call; and (c) selecting which of said non-empty set of agents will service said call C based on: (i) agent responses to said prompts, and (ii) for at least one of said non-empty set of agents, a measure of how closely prior agent responses compared to actual remaining service times.

DETAILED DESCRIPTION

For the purposes of this specification, a "call" is defined to encompass all types of communications including a traditional voice telephone call, a videophone call, an email message, a text-based instant message, etc.

Figure 1:
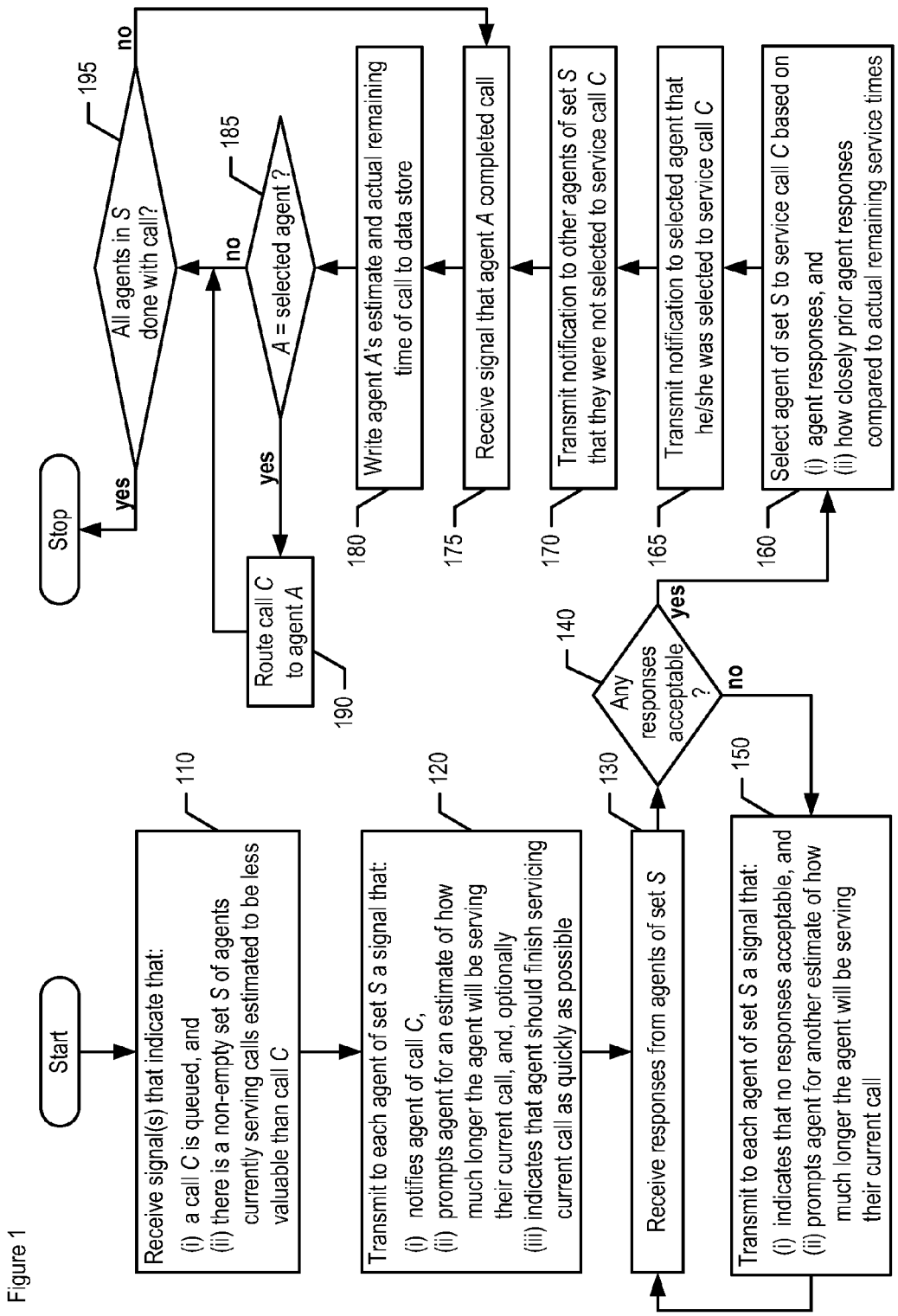
FIG. 1 depicts a flowchart of the salient tasks of a method of handling calls at a call center, in accordance with the first illustrative embodiment of the present invention.

FIG. 1 depicts a flowchart of the salient tasks of a method of handling calls at a call center, in accordance with the first illustrative embodiment of the present invention. In accordance with the first illustrative embodiment of the present invention, the tasks of the method of FIG. 1 are performed by a data-processing system of the call center (e.g., a server, a router, etc.). As will be appreciated by those skilled in the art, in some embodiments of the present invention, this data-processing system might also handle other functions of the call center (e.g., queue management, application logic, interactive voice response [IVR] system functions, etc.), while in some other embodiments of the present invention, this data-processing system might be dedicated to performing the tasks of the method of FIG. 1. Moreover, it will be clear to those skilled in the art, after reading this disclosure, which tasks depicted in FIG. 1 can be performed simultaneously or in a different order than that depicted.

At task 110, one or more signals are received that indicate that: (i) a call C to the call center is queued for service, and (ii) there is a non-empty set S of agents who are currently serving calls that are estimated to be less valuable than call C. As will be appreciated by those skilled in the art, the value of a queued call might be estimated in a variety of ways (e.g., based on the identity of the caller, etc.); similarly, the value of a call that is currently being serviced might be estimated in a variety of ways (e.g., based on the identity of the caller, based on the dollar amount of merchandise already ordered during the call, etc.) As will further be appreciated by those skilled in the art, in some embodiments of the present invention, the data-processing system performing the tasks of FIG. 1 might be responsible for estimating the value of queued calls and currently-served calls, while in some other embodiments of the present invention, one or more other data-processing systems of the call center (e.g., a queue management server, a billing application, etc.) might handle these functions.

At task 120, a signal is transmitted to each of the agents of set S that:
  (i) notifies the agent of call C,
  (ii) prompts the agent for an estimate of how much longer the agent will be serving their current call, and, optionally
  (iii) indicates that the agent should finish servicing their current call as quickly as possible.

In accordance with the illustrative embodiment, the notification, prompt, and indication are conveyed to the agent via a video display terminal (e.g., a "dumb" terminal, a monitor connected to a data-processing system, etc.). As will be appreciated by those skilled in the art, in some other embodiments of the present invention, some or all of the notification, prompt, and indication might be conveyed to the agent in some other manner (e.g., via audio output to a wireless headset, via audio output to a speaker connected to a data-processing system, etc.).

As will further be appreciated by those skilled in the art, for embodiments in which the indication (i.e., option (iii)) is omitted, the notification and prompt might implicitly have the effect of encouraging the agent to wrap up their current call as quickly as possible. As will yet further be appreciated by those skilled in the art, in some embodiments of the present invention the prompt might enable an agent to provide a range (e.g., a minimum-maximum range, a 90% confidence interval, etc.), or might enable an agent to decline servicing call C (in which case the agent is removed from consideration as a potential candidate to service call C.)

At task 130, responses from the agents of set S are received, in well-known fashion. As will be appreciated by those skilled in the art, in some embodiments of the present invention the agents might specify their responses via a graphical user interface of a data-processing system, while in some other embodiments of the present invention, the agents might specify their responses in some other fashion (e.g., via a microphone connected to a data-processing system, etc.)

Task 140 branches based on whether at least one of the responses received at task 130 is acceptable (e.g., whether there is a response that indicates a maximum waiting time of 15 seconds for call C, etc.). If so, execution continues at task 160, otherwise execution proceeds to task 150.

At task 150, a signal is transmitted to each of the agents of set S that:
  (i) indicates that none of the agent responses were acceptable, and
  (ii) prompts the agent for another estimate of how much longer the agent will be serving their current call.
After task 150, execution continues back at task 130.

At task 160, one of the agents of set S is selected to service call C, based on: (i) the agent responses received at task 130, and (ii) on a per-agent basis, a measure of how closely prior agent responses compared to actual remaining service times. In accordance with the illustrative embodiment, task 160 comprises consulting a data store (e.g., a relational database, a file system, a random-access memory, etc.) that stores prior agent responses and actual remaining service times.

As will be appreciated by those skilled in the art, in some embodiments of the present invention, the measure might be an adjustment factor that quantifies how accurate a particular agent has been in prior responses (an adjustment factor of 1.2, for example, might indicate that a particular agent's response should be increased by 20 percent), while in some other embodiments of the present invention, some other type of measure might be employed. As will further be appreciated by those skilled in the art, in some embodiments of the present invention, the data store that stores prior agent responses and actual remaining service times might be part of the data-processing system that executes the tasks of FIG. 1 (e.g., the data store might reside on a disk drive of the data-processing system, etc.), while in some other embodiments of the present invention, the data store might be distinct (e.g., a network-attached storage device, a database server, etc.). As will yet further be appreciated by those skilled in the art, in some alternative embodiments of the present invention, the data store might store information that is based on (i.e., derived from) the prior agent responses and actual remaining service times (e.g., the individual differences between these quantities, the average difference between these quantities, the relative difference between these quantities, etc.) instead of, or in addition to, the raw quantities themselves.

At task 165, a signal is transmitted to the selected agent that notifies the agent that he or she has been selected to service call C.

At task 170, a signal is transmitted to the agents of set S that were not selected; this signal notifies the agents that another agent will be servicing call C.

At task 175, a signal is received that indicates that an agent A of set S (either the selected agent or an agent who was not selected) has completed servicing their current call, and is now available.

At task 180, the estimate provided by agent A and the actual remaining time of agent A's current call are written to the data store.

Task 185 branches based on whether agent A is the agent selected to service call C. If so, execution proceeds to task 190, otherwise execution continues at task 195.

At task 190, call C is routed to the selected agent A, in well-known fashion.

Task 195 branches based on whether all agents of set S have completed their calls. If not, execution continues back at task 175, otherwise the method of FIG. 1 terminates.

As will be appreciated by those skilled in the art, in some embodiments of the present invention it might be advantageous to adjust the timing and repetition of the loop of tasks 130 through 150 (i.e., pinging the agents and assessing their responses) so that agents are not overly "bombarded" and are given sufficient time to respond to prompts. As will further be appreciated by those skilled in the art, in some embodiments of the present invention it might be advantageous to change the threshold of what constitutes "acceptable" during subsequent iterations of this loop. For such embodiments, it will be clear to those skilled in the art, after reading this disclosure, how to modify the method of FIG. 2 accordingly.

Figure 2:
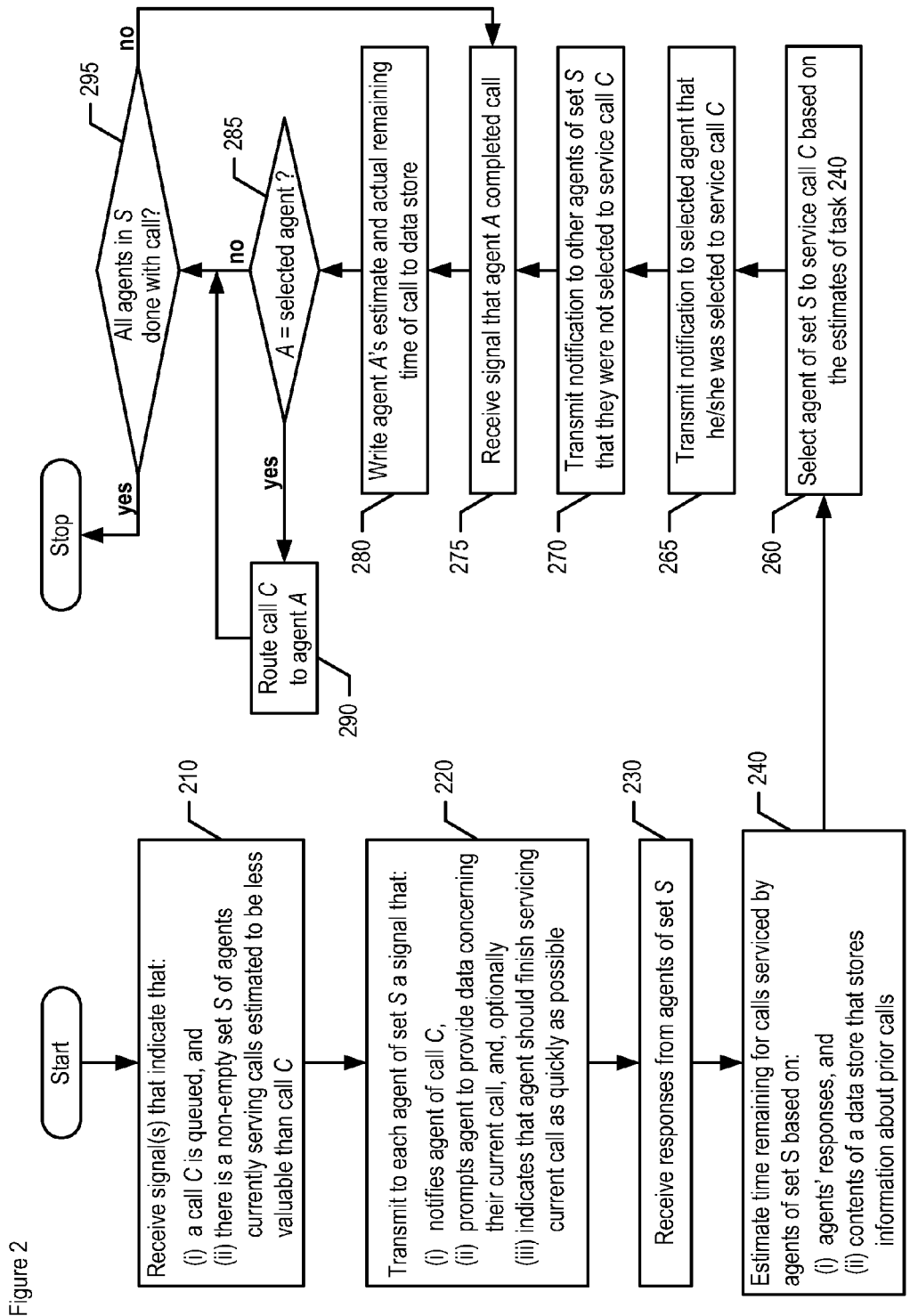
FIG. 2 depicts a flowchart of the salient tasks of a method of handling calls at a call center, in accordance with the second illustrative embodiment of the present invention.

FIG. 2 depicts a flowchart of the salient tasks of a method of handling calls at a call center, in accordance with the second illustrative embodiment of the present invention. As in the first illustrative embodiment, the tasks of the method of FIG. 2 are performed by a data-processing system of the call center (e.g., a server, a router, etc.). As will be appreciated by those skilled in the art, in some embodiments of the present invention, this data-processing system might also handle other functions of the call center (e.g., queue management, application logic, interactive voice response [IVR] system functions, etc.), while in some other embodiments of the present invention, this data-processing system might be dedicated to performing the tasks of the method of FIG. 2. Moreover, it will be clear to those skilled in the art, after reading this disclosure, which tasks depicted in FIG. 2 can be performed simultaneously or in a different order than that depicted.

At task 210, one or more signals are received that indicate that: (i) a call C to the call center is queued for service, and (ii) there is a non-empty set S of agents who are currently serving calls that are estimated to be less valuable than call C. As in the first illustrative embodiment, the value of a queued call might be estimated in a variety of ways (e.g., based on the identity of the caller, etc.); similarly, the value of a call that is currently being serviced might be estimated in a variety of ways (e.g., based on the identity of the caller, based on the dollar amount of merchandise ordered previously, the activity of the caller to prompts in a self-service application, etc.) As will further be appreciated by those skilled in the art, in some embodiments of the present invention, the data-processing system performing the tasks of FIG. 2 might be responsible for estimating the value of queued calls and currently-served calls, while in some other embodiments of the present invention, one or more other data-processing systems of the call center (e.g., a queue management server, a billing application, etc.) might handle these functions.

At task 220, a signal is transmitted to each of the agents of set S that:
  (i) notifies the agent of call C,
  (ii) prompts the agent to provide one or more data concerning their current call, and, optionally
  (iii) indicates that the agent should finish servicing their current call as quickly as possible.

In accordance with the second illustrative embodiment, each agent is prompted to identify the current "work stage" of their call (e.g., opening salutation stage, order placement, order confirmation, etc.). As will be appreciated by those skilled in the art, in some other embodiments of the present invention, one or more other data concerning the current call might be specified by an agent (e.g., an indication of how decisive the caller is, an indication of how quickly the caller speaks, etc.).

As in the first illustrative embodiment, the notification, prompt, and indication are conveyed to the agent via a video display terminal (e.g., a "dumb" terminal, a monitor connected to a data-processing system, etc.). As will be appreciated by those skilled in the art, in some other embodiments of the present invention, some or all of the notification, prompt, and indication might be conveyed to the agent in some other manner (e.g., as audio via a wireless headset, as audio via a speaker connected to a data-processing system, etc.).

As will further be appreciated by those skilled in the art, for embodiments in which the indication (i.e., option (iii)) is omitted, the notification and prompt might implicitly have the effect of encouraging the agent to wrap up their current call as quickly as possible. As will yet further be appreciated by those skilled in the art, in some embodiments of the present invention the prompt might enable an agent to decline servicing call C (in which case the agent is removed from consideration as a potential candidate to service call C.)

At task 230, responses from the agents of set S are received, in well-known fashion. As will be appreciated by those skilled in the art, in some embodiments of the present invention the agents might specify their responses via a graphical user interface of a data-processing system, while in some other embodiments of the present invention, the agents might specify their responses in some other fashion (e.g., via a microphone connected to a data-processing system, etc.).

At task 240, the time remaining for each of the calls serviced by the agents of set S is estimated based on (i) the agents' responses, and on (ii) the contents of a data store that stores information about prior calls. In accordance with the second illustrative embodiment, this information includes the following data:

the times, or ranges of elapsed time, for each work stage of a call;
the identity of the agent who handled a call;
the particular agent capabilities required for a call;
the degree of skill of the particular agent;
the identity of the caller;
the location of the caller;
the mode of the call (e.g., by clicking on a button on a web page, via a conventional telephone call, etc.); and
the day and time.

As will be appreciated by those skilled in the art, given the work stages reported by the agents and the contents of the data store, the expected time remaining for each of the agents' calls can be estimated via conventional statistical techniques. Similarly, other quantities such as the minimum time remaining, the maximum time remaining, the endpoints of a 90% confidence interval, and so forth can be estimated for each call in an analogous fashion. As will further be appreciated by those skilled in the art, some other embodiments of the present invention might employ a data store that stores other types of information about prior calls—either instead of, or in addition to, the data of the second illustrative embodiment—and it will be clear to those skilled in the art, after reading this disclosure, how to make and use embodiments of the present invention that employ such data stores.

At task 260, one of the agents of set S is selected to service call C based on the estimates of task 240. As will be appreciated by those skilled in the art, in some embodiments of the present invention the agent with the shortest estimated time remaining might be selected to service call C, while in some other embodiments of the present invention, an agent might be selected based on some other criterion (e.g., the agent with the smallest maximum time remaining, etc.).

At task 265, a signal is transmitted to the selected agent that notifies the agent that he or she has been selected to service call C.

At task 270, a signal is transmitted to the agents of set S that were not selected; this signal notifies the agents that another agent will be servicing call C.

At task 275, a signal is received that indicates that an agent A of set S (either the selected agent or an agent who was not selected) has completed servicing their current call, and is now available.

At task 280, pertinent data for agent A's completed call are written to the data store, in well-known fashion.

Task 285 branches based on whether agent A is the agent selected at task 260. If agent A is in fact the selected agent, execution proceeds to task 290, otherwise execution continues at task 295.

At task 290, call C is routed to the selected agent A, in well-known fashion.

Task 295 branches based on whether all agents of set S have completed their calls. If not, execution continues back at task 275, otherwise the method of FIG. 2 terminates.

As will be appreciated by those skilled in the art, in some other embodiments of the present invention, the call center system might be capable of determining some or all of the information that agents are prompted for (e.g., work stage, etc.), and it will be clear to those skilled in the art, after reading this disclosure, how to modify the method of FIG. 2 accordingly for such embodiments.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   (a) receiving one or more signals that indicate that:
      (i) a call C to a call center is queued for service, and
      (ii) a non-empty set of agents of said call center are currently serving respective calls that are estimated to be less valuable than said call C;
   (b) transmitting to each of said non-empty set of agents, in response to said one or more signals, a first signal that:
      (i) notifies the agent of said call C, and
      (ii) prompts the agent for an estimate of how much longer the agent will be serving their current call; and
   (c) selecting which of said non-empty set of agents will service said call C based on:
      (i) agent responses to said prompts, and
      (ii) for at least one of said non-empty set of agents, a measure of how closely prior agent responses compared to actual remaining service times.

2. The method of claim 1 further comprising transmitting to each of said non-empty set of agents a second signal that:
   (i) indicates that none of the agent responses were acceptable, and
   (ii) prompts the agent for another estimate of how much longer the agent will be serving their current call.

3. The method of claim 1 further comprising notifying members of said non-empty set of agents that were not selected that another agent will service said call C.

4. The method of claim 1 further comprising routing said call C to the selected agent when the selected agent is available.

5. The method of claim 1 further comprising storing in a data store an indication of the respective differences between:
   (i) the estimates provided by the agents, and
   (ii) the actual remaining times required for the agents to service their current calls.

6. The method of claim 1 wherein the prompt for an estimate enables an agent to specify a range.

7. The method of claim 1 wherein the prompt for an estimate enables an agent to decline servicing said call C.

8. The method of claim 1 wherein said first signal also comprises an indication that the agent should finish servicing their current call as quickly as possible.

9. A method comprising:
   (a) receiving one or more signals that indicate that:
      (i) a call C to a call center is queued for service, and
      (ii) a non-empty set of agents of said call center are currently serving respective calls that are estimated to be less valuable than said call C;
   (b) transmitting to each of said non-empty set of agents, in response to said one or more signals, a first signal that:
      (i) notifies the agent of said call C, and
      (ii) prompts the agent for one or more data pertaining to their current call;
   (c) estimating, based on responses to said prompts, remaining service times for current calls for at least one of said non-empty set of agents; and
   (d) selecting, based on the estimated remaining service times, which of said non-empty set of agents will service said call C.

10. The method of claim 9 wherein the estimating is also based on historical data.

11. The method of claim 9 further comprising notifying members of said non-empty set of agents that were not selected that another agent will service said call C.

12. The method of claim 9 further comprising routing said call C to the selected agent when the selected agent is available.

13. The method of claim 9 further comprising storing in a data store:
   (i) the one or more data provided by the agents, and
   (ii) the actual remaining times required for the agents to service their current calls.

14. The method of claim 9 wherein said first signal also comprises an indication that the agent should finish servicing their current call as quickly as possible.

15. The method of claim 9 wherein said one or more data identifies one of a plurality of stages of a call.

* * * * *